(12) United States Patent
Osher et al.

(10) Patent No.: US 7,027,658 B2
(45) Date of Patent: Apr. 11, 2006

(54) SYSTEM FOR GEOMETRICALLY ACCURATE COMPRESSION AND DECOMPRESSION

(75) Inventors: Stanley Joel Osher, Pacific Palisades, CA (US); Hong-Kai Zhao, Irvine, CA (US)

(73) Assignee: Level Set Systems, Inc., Pacific Palisades, CA (US)

( * ) Notice: Subject to any disclaimer, the term of this patent is extended or adjusted under 35 U.S.C. 154(b) by 563 days.

(21) Appl. No.: 10/039,748

(22) Filed: Dec. 18, 2001

(65) Prior Publication Data

US 2003/0025703 A1 Feb. 6, 2003

Related U.S. Application Data

(60) Provisional application No. 60/257,210, filed on Dec. 20, 2000.

(51) Int. Cl.
*G06K 9/36* (2006.01)

(52) U.S. Cl. ...................................................... 382/243

(58) Field of Classification Search ........ 382/232–236, 382/238–240, 242–243, 100, 284, 305; 348/113, 348/117–119, 121–123; 701/1, 13, 14; 342/25 R, 342/46, 52; 340/953–957, 967–970
See application file for complete search history.

(56) References Cited

U.S. PATENT DOCUMENTS

| 4,729,127 | A | * | 3/1988 | Chan et al. | ................. | 382/240 |
| 4,890,249 | A | * | 12/1989 | Yen | .............................. | 703/13 |
| 4,906,940 | A | * | 3/1990 | Greene et al. | ............. | 382/100 |
| 5,546,084 | A | * | 8/1996 | Hindman | ................... | 342/25 R |
| 5,552,787 | A | * | 9/1996 | Schuler et al. | ............ | 342/25 R |
| 6,347,263 | B1 | * | 2/2002 | Johnson et al. | ................ | 701/14 |
| 6,393,163 | B1 | * | 5/2002 | Burt et al. | ................... | 382/294 |
| 6,404,431 | B1 | * | 6/2002 | Farmer | ........................ | 345/428 |
| 6,507,660 | B1 | * | 1/2003 | Wirtz et al. | ................. | 382/103 |

\* cited by examiner

*Primary Examiner*—Jose L. Couso
(74) *Attorney, Agent, or Firm*—Michael J. Bell; Howrey LLP

(57) ABSTRACT

A system is disclosed providing accurate compression, storage, transmission and reconstruction of both simulated and empirical data representing terrain and other physical or hypothetical signals or surfaces, in one or multiple dimensions. In one embodiment, a gradient of an original surface is generated, and the data representing that gradient is compressed, then stored and/or transmitted. Reconstruction of the gradient yields an accurate representation of the original gradient. An alternative embodiment includes taking a second gradient of the original surface before compression, in which case reconstruction yields the second gradient, from which the first gradient can also be recovered.

3 Claims, 8 Drawing Sheets

Example 1: N = 10 and
$u_j = j/10$ (j = 1, 2, ..., 10)

Example 1: N = 10 and
$|\nabla u|_j = 1$ (j = 1, 2, ..., 10)

Example 2: N = 10 and
$|\nabla u|_j = 1$ (j = 1, 2, ..., 10)

Example2: N = 10 and $\left|\nabla|\nabla u|\right|_j = 1$ (j = 1, 2, ..., 10)

SYSTEM FOR GEOMETRICALLY ACCURATE COMPRESSION AND DECOMPRESSION

This application claims the benefit of U.S. Provisional Application No. 60/257,210, of Osher et al., filed Dec. 20, 2000, entitled "Geometrically Accurate Compression and Decompression", which is incorporated herein by reference.

BACKGROUND OF THE INVENTION

The present invention relates to a system for compressing and reconstructing (decompressing) signals, including signals representing physical data such as terrain. Such signals may be computer-constructed data, empirically derived images or signals, or in general any information or data representing actual or simulated phenomena.

After compression of data representing a terrain, digital terrain elevation (or images, indeed any graph) data ("DTED"), a common problem is accurate reconstruction of terrain features, such as the slope. Given digitized data representing terrain elevation, or indeed any graph in two or more dimensions at a data point (x,y) (or the multiple dimension extension at a data point $(x_1, \ldots, x_n)$), it is highly useful to be able to compress and decompress the data in such a way that terrain—or, more generally, graph or image features—are accurately reconstructed.

Conventional systems in current use compress the data, store or transmit it as needed, and at a later point reconstruct the data from the compressed-data files. This can lead to large errors in derived quantities obtained from the reconstructed data, in particular when the gradient of the reconstructed data is taken.

The gradient of the original data is often of considerable interest. In the case of DTED, it may be important for aircraft to be aware of the precise terrain slopes, and the errors introduced by determining gradients from reconstructed data may be too great to be of practical use for many applications.

Especially for lossy compression techniques, a reconstructed image generally does not have the same values for the norm of the gradient that the original image had. In fact, errors in the gradient are often quite large for higher compression ratios. These errors are quite significant since the accuracy of the terrain slope is crucial in many areas, e.g. landing of aircraft in navigation exercises.

Accordingly, a system is needed that can compress and reconstruct multidimensional data, such as terrain data or other signals, with an increased accuracy in the reconstructed information, and in particular in the gradients that are determined from the reconstructed data, and the norms of those gradients.

SUMMARY OF THE INVENTION

An apparatus and method according to one embodiment of the present invention are implemented in a processor-based system. A method according to the invention provides an accurately compressed and reconstructed signal, and in particular accurately reconstructed gradients of the original signal, by applying compression procedures to the gradient of the original signal. An alternative embodiment further involves the process of generating a second gradient of the original signal, and compressing that second gradient, which upon decompression provides an accurate reconstruction of the second gradient of the original signal. The methods of the invention are suitable for compressing, storing, transmitting and reconstructing both simulated and empirical data representing terrain and other physical or hypothetical signals or surfaces, in one or multiple dimensions.

DESCRIPTION OF THE PREFERRED EMBODIMENTS

Figure 1:
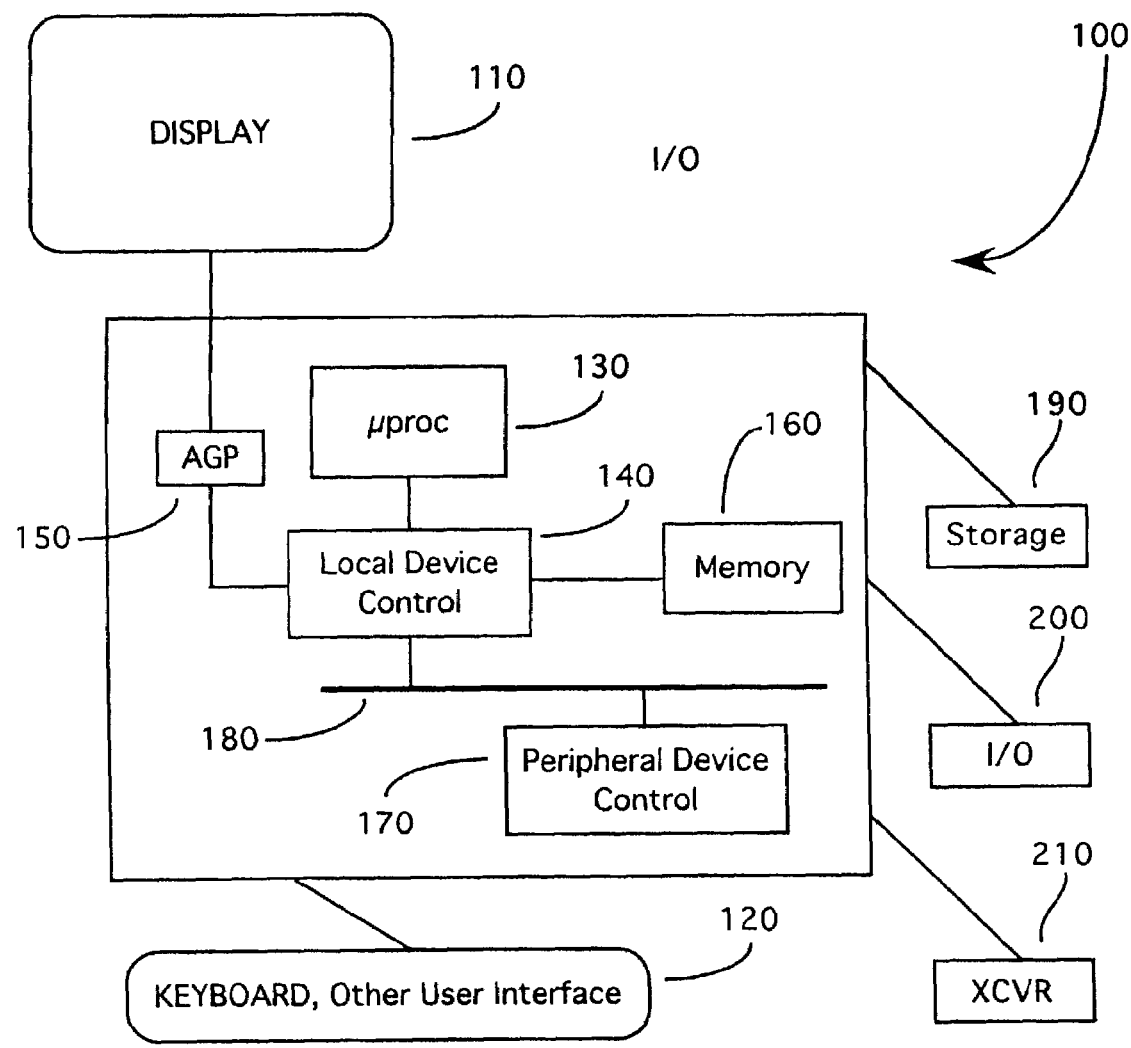
FIG. 1 is a block showing a processor-based system suitable for an implementation of the present invention.

FIG. 1 illustrates a processor-based system 100, such as a workstation or a server, in connection with the present invention may be implemented. The system 100 is coupled to a display 110 and one or more user interface devices 120 (such as a mouse, keyboard, track ball, etc.), and operates under control of at least one microprocessor 130 (though it may be a multiprocessor system).

The processor 130 is connected to a local device control circuitry 140, which includes circuitry that controls data and command exchanges with local devices such as the display 110 via an accelerated graphics processor (AGP) 150 and memory 160, which may in a typical system will include multiple DIMMs (dual in-line memory modules) or other suitable memory modules or media.

The local device control circuitry 140 is connected to a peripheral device control circuit 170 via a bus such as PCI bus 180. The system 100 additionally is connected to local internal and/or external storage 190.

Input/output (I/O) channels 200 are connected to or in communication with the system 100, and may include conventional network connections, wireless communications devices, and/or other conventional apparatus for exchanging data with the system 100. In addition, transmitters, receivers or in general transceivers 210 may be connected to or in communication with the system 100, which are suitable for remote or isolated operations include weather stations or other telemetry stations, on aircraft, etc.

The compression and decompression operations of the present invention are in one embodiment carried out under the control of program modules stored in the memory 160 and executing on the processor 130. These operations may be implemented in and/or executed by software, hardware (e.g. in configured field gate arrays, custom logic, etc.), firmware or some combination thereof. In this application, the term "logic" will be used to refer to any such appropriate combination of software, hardware, firmware or other manner of implementing the invention.

The image, terrain, or other data relating to the invention will typically take the form of data files stored in memory or in some storage medium, which can be read, modified, stored, output, displayed and printed by the computer system, either under automatic (or program) control or under the direction of a user.

Compression and Reconstruction of Gradient Data

The system of the invention is applicable to many types of compression procedures presently in use, with improved accuracy of the reconstructed signals, and in particular of their gradients (or slopes) and corresponding norms of those gradients. An example of one appropriate compression procedure is a histogram equalization procedure, as described, for instance, in Sapiro, G. and Caselles, V., "Histogram Modification via Differential Equations", *Journal of Differential Equations*, Vol. 135, No. 2, pp. 238–268 (1997), which is incorporated herein by reference. Generally, appropriate compression procedures include those that are exact for constant signals, but are lossy in the general case (such as JPEG or histogram equalization).

Thus, the inventive methods may be applied to signals processed according to any compression procedures. In addition, the inventive methods may be applied to signals representing data of many dimensions. However, for the sake of the following discussion a two-dimensional signal will be taken as an example.

The normal vector to the signal or graph representing a surface or terrain is given by:

$$\frac{(-u_x, -u_y, 1)}{\sqrt{(1+u_x^2+u_y^2)}}.$$

It follows that the steepness (or slope) of the terrain surface is determined by the gradient of that signal, namely:

$$|\nabla u| = \sqrt{u_x^2 + u_y^2}.$$

A method according to the present invention compresses the gradient $|\nabla u|$, rather than the signal u itself. The basic framework of such a method is carry out the following operations:

Operation #1: Compute $|\nabla u|$ either analytically or numerically. (It may be done analytically for simulated data, and numerically for empirical data, or even analytically for empirical data that has been approximated by mathematical representations.)

Operation #2: Use any suitable compression technique to compress and store (or transmit) $|\nabla u|$ as $\overline{|\nabla u|}$.

Operation #3: Recover a reconstructed signal v by solving the equation:

$$|\nabla v| = \overline{|\nabla u|}. \quad \text{Equation A}$$

In particular, this can be solved using fast numerical level set based procedures for solving the Eikonal equation $|\nabla v| = \overline{|\nabla u|}$.

Figure 7:
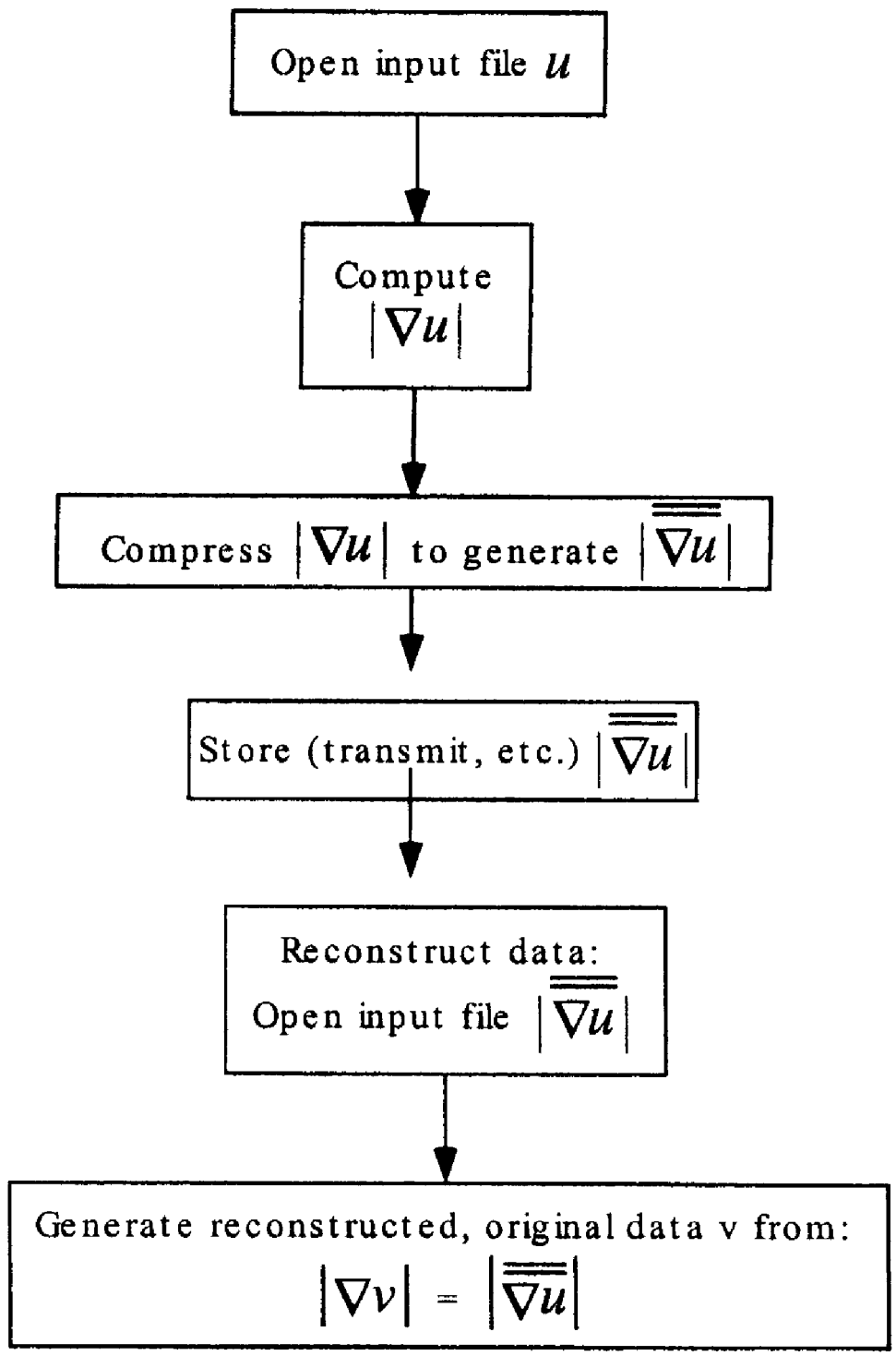
FIGS. 7–8 are flow charts representing methods implementing aspects of the present invention.

FIG. 7 is a flow chart according to this series of operations.

An Eikonal equation is one of the form $$\sqrt{v_x^2 + v_y^2} = C(x,y) \text{ for } C(x,y) > 0.$$

This gives a generalized distance to a set. If C≡1, then the distance is a real distance. Examples of this may include: (a) distance to the origin of a coordinate system, and (b) distance to a set defined by the equation x=0.

(a) Distance to the origin.
If $v = \sqrt{x^2+y^2}$, the distance is to the origin x=y=0, with:

$$v_x = \frac{x}{\sqrt{x^2+y^2}}; \quad v_y = \frac{y}{\sqrt{x^2+y^2}}; \quad \text{and}$$

$$v_x^2 + v_y^2 = \frac{x^2+y^2}{x^2+y^2} = 1$$

(b) Distance to a set x=0.
If v =|x|, the distance represents a distance to the set x=0, with:
$v_x=1$ if x>0;
$V_x=-1$ if x<0; and
$V_y=0$;

and thus $v_x^2+v_y^2=1$. At least a few values of v=u at a few data points are input, including certain boundary points and points of extrema of u.

A system according to the present invention can take advantage of fast methods to compute the unique viscosity solution to this Hamilton-Jacobi nonlinear partial differential equation, i.e. the Eikonal Equation A above. The viscosity solution is used because $|\overline{\nabla u}|$ represents $$\frac{1}{\text{velocity}}$$

in the Eikonal Equation. Thus, we can view Equation A above as finding the distance v in that variable metric.

Operation #3 above involves the solution of $$|\nabla v| = f(x,y),$$

where $f(x,y) = |\overline{\nabla u}|$ is the compressed quantity. As mentioned above, this may be a numerical or an analytical solution.

It has been proven that there exists a unique viscosity solution to this equation, given the values of u at appropriate data points. See Rouy, E. and Tourin, A., *A viscosity solutions approach to shape from shading*, SIAM Journal of Numerical Analysis, Vol. 29, No. 3, pp. 867–884 (1992). There are fast Dijkstra-like algorithms and/or sweeping algorithms that are designed for this purpose. On Dijkstra-like algorithms, see: J. N. Tsitsiklis, "Efficient Algorithms for Globally Optimal Trajectories", IEEE Transactions on Automatic Control, Vol. 40, No. 9, September 1995, pp. 1528–1538, which is incorporated herein by reference.

To solve the Eikonal equation in any number of independent variables (x,y,z . . . ) on a distance grid with n points and values of u assigned at isolated points, there is a shortest-path type of algorithm given by Tsitsiklis, which runs in optimal time O(n log n), with n being the number of pixels. Dijkstra approach is a classical algorithm which computes the "taxicab" distance metric, i.e. which solves:

$$\max(|u_x|,|u_y|) = C(x,y)$$

in this optimal time. Tsitsiklis generalized it to the true geodesic distance (as the crow flies). The classical algorithm and its generalization update each grid point once in increasing order of distance, and may use an O(log n) heapsort search.

Fast sweeping algorithms solve the same algebraic expression as the Dijkstra-like algorithms on the grid at each point—however, not in increasing order of distance, but rather in an iterative fashion, updating points as often as needed until convergence within a predetermined tolerance. Fast sweeping methods can involve simplified programming and can be faster, e.g. if $C(x,y) \equiv 1$ and a left-right, up-down procedure is used. See, e.g., M. Boue and P. Dupuis, *Markov chain approximations for deterministic control problems with affine dynamics and quadratic cost in the control*, SIAM J. Numer. Analysis, Vol. 36, No. 3, pp. 667–695 (1999).

Input used for these fast solution techniques (which can be referred to as "fast solvers") are the numerical values of $f(x,y)$ and the values of u at grid points where $|\nabla u|$ is less than some very small tolerance (i.e. where u might be an extremum).

This present invention is thus useful in combination with any compression routine.

One might consider the approach of compressing the vector $\nabla u = (u_x, u_y)$ to get $\overline{\nabla u} = (\overline{u_x}, \overline{u_y})$, and then recover u. There are two conditions that must be considered to avoid inaccuracies in the reconstruction of the gradient:

(i) There is a need for compatibility, i.e.

$$(\overline{u_x})_y = (\overline{u_y})_x,$$

at least approximately, and this is generally false for the recovered u, using this simplified procedure.

(ii) Reconstructing u from one compressed derivative, e.g. solving numerically $v_x = \overline{u_x}$ can lead to large errors in the resulting $v_y$.

Reconstruction of the signal from the decompressed gradient is effectively an integration process, which can be carried out numerically or can be carried out analytically for a function derived from or representing the decompressed signal (within some predetermined level of accuracy). Such integration can be carried out for each level of gradient operation (e.g. for second gradients—see Alternative Method I, below).

Figure 8:
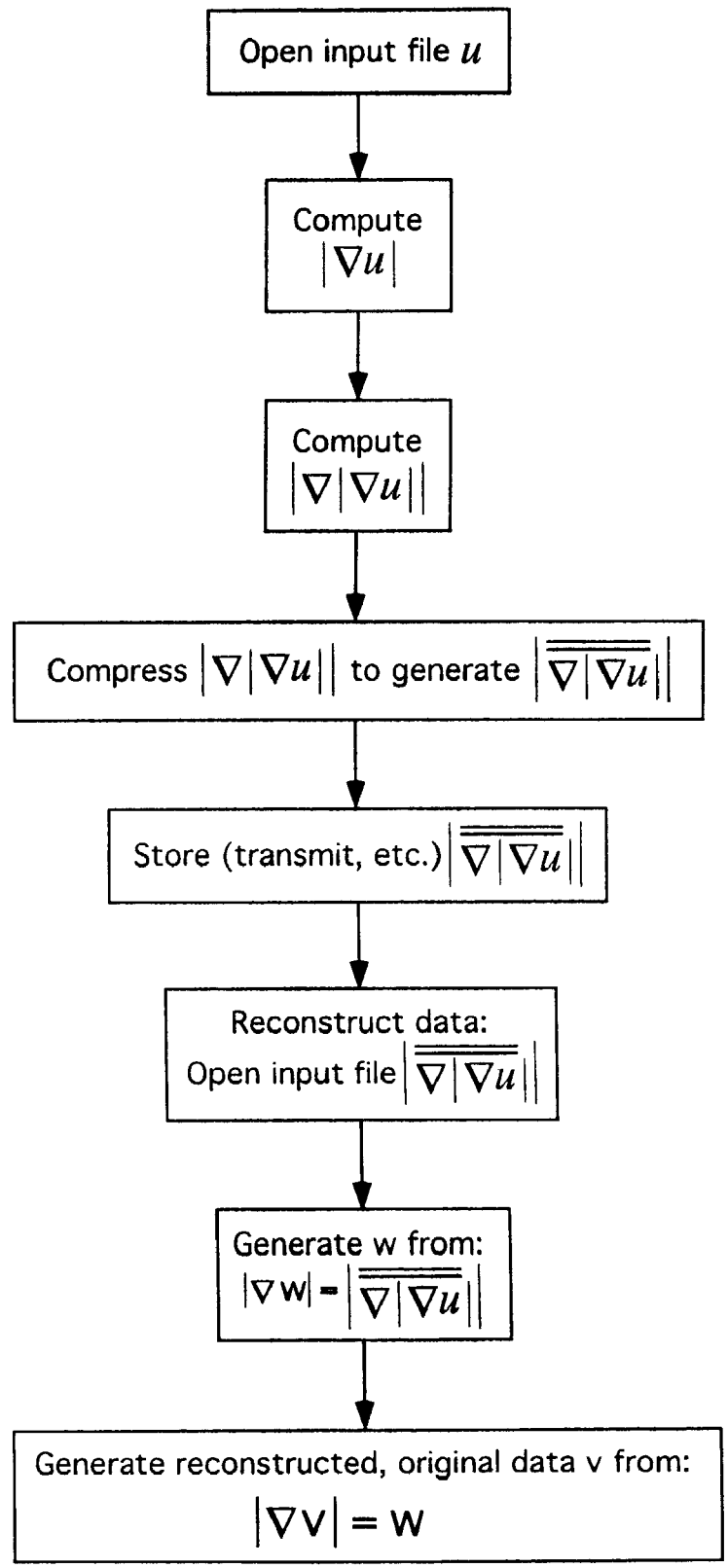

Other implementations of the basic method for solving $|\nabla u| = |\overline{\nabla u}|$ can be enhanced in several ways. FIG. 8 is a flow chart illustrating an Alternative Method I, as follows.

Alternative Method I (1) Compute numerically $|\nabla u|$.

(2) Compute numerically $|\nabla|\nabla u||$.

(3) Compress and store $|\nabla|\nabla u||$, obtaining $\overline{|\nabla|\nabla u||}$.

(4) Recover v using fast a Eikonal solver twice. First solve for w in $$|\nabla w| = \overline{|\nabla|\nabla u||}.$$

Then solve for v in $$|\nabla v| = w.$$

Wherever numerical computation or data generation is called for herein, it should be understood that under appropriate circumstances an analytical solution may be generated, and vice-versa. In either case, a predetermined level of accuracy may be used a controlling factor, e.g. for the compression, gradient, integration and/or reconstruction operations.

The extra data storage that would be used for this algorithm is the storage of $v = u$ and $|\nabla v| = |\nabla u|$ at extrema, i.e. those points for which $|\nabla u|$ and $|\nabla|\nabla u||$, respectively, have values below a small predefined tolerance.

This method can be generated recursively to N Eikonal solvers. The extra storage is minimal, but the decompression step would be approximately N times slower.

Alternative Method II (1) Solve $|\nabla w| = \overline{|\nabla u|}$.

(2) Compress $|\nabla(u-w)|$, and obtain $\overline{|\nabla(u-w)|}$.

(3) Solve $|\nabla z| = \overline{|\nabla(u-w)|}$.

In steps (1) and (3), use the values of u and u−w, respectively, at their approximate extrema, as usual.

(4) Then obtain v, the reconstruction of u, via $v = w + z$.

This method adds a correction to the basic method by compressing and reconstructing errors in $|\nabla u|$.

Recovering Curvature

Additionally, other geometric features of the terrain, for example mean curvature of the surface, can be recovered from compressed data in a similar manner. Following is a procedure for recovering curvature.

For a surface defined by $$z = u(x,y),$$

its mean curvature is:

$$k = \frac{u_{xx}(u_y^2 + 1) - 2u_{xy}u_x u_y + u_{yy}(u_x^2 + 1)}{(1 + u_x^2 + u_y^2)^{3/2}}.$$

See S. Osher and J. A. Sethian, "Fronts Propagating with Curvature-Dependent Speed: Algorithms Based on Hamilton—Jacobi Formulations", Osher, S., and Sethian, J. A., Journal of Computational Physics, Vol. 79, pp. 12–49 (1988), which is incorporated herein by reference.

This involves first and second partial derivatives of u. Thus, in order to recover curvature from compressed data, Alternative Method I above can be used, with $N \geq 2$. This allows the recovery of a signal v whose second and first derivatives are accurate approximations to those of u. Then a numerical implementation for the expression defining k above may be used, where v replaces u.

Higher derivatives of curvature—in fact all geometric features—can be recovered in an analogous fashion, which will be clear from the foregoing to those skilled in the art. For instance, instead of using the Eikonal equation, one can take any elliptic differential operator of second or higher order, for example the Laplacian $$\mathcal{L}(v) = u_{xx} + u_{yy},$$

and solve numerically $$\mathcal{L}(v) = \overline{\mathcal{L}(v)}$$

for v, where appropriate boundary conditions are imposed. Then geometric features can be recovered as above.

The inventive methods provide improved compression ratios for DTED, images or graphs which have large flat regions where $|\nabla u|$ or any desired feature will be zero, hence easy to compress. Thus the inventive methods are highly accurate in these situations in retrieving the data, as well as the desired feature or features.

Pseudocode Appropriate for Method Involving Compressing Normals to Gradients

The following pseudocode relates to compressing a quantity, e.g. the norm of the gradient, from an original set of data, and recovering the original data from the compressed quantity.

```
// Read in the original file and store it as quantity u[i][j]
// Compute the derived quantity, e.g. norm of grad u[i][j]
// Store the norm as a separate quantity v[i][j]
%% Compression routines are completely up to the users'
preference.
%% Possible compression techniques include JPEG-LS, JPEG,
LSS (Level Set
%% Systems of Los Angeles, California).
%% LSS' technique can used with lossy compression
techniques, wherein
%% there are errors between the original and restored image.
        // Compress the original file
        // Compress the normal vectors file
        // Decompress the compressed original file
        // Decompress the compressed normal vectors file
// Read in the compressed/decompressed original file - store it as
quantity uc[i][j]
// Read in the compressed/decompressed normal vectors
file - store it as quantity vc[i][j]
// Reconstruct an approximation to the original image u[i][j],
from the compressed/decompressed quantity vc[i][j]. This
reconstruction is based upon numerically solving the partial
differential equation:
        | grad W| = vc[i][j]   for w[i][j]
// As an initial guess, you may used w = uc[i][j],
or set w = stored values of u[i][j]at isolated extrema.
```

From this procedure, it can result that w[i][j] will be a better approximation to u[i][j] than uc[i][j], because the relevant quantity v[i][j] will be better approximated by w[i][j] than it will be by uc[i][j].

The Level Set Systems approach mentioned above can be found in applicant's copending patent application, "Method and Apparatus for Feature-Based Quantization and Compression of Data", Ser. No. 09/737,834 filed Dec. 14, 2000, which is incorporated herein by reference.

Examples of Application of Methods According to the Invention

Examples 1 and 2 below will be discussed in connection with FIGS. 2–6.

Figure 2:
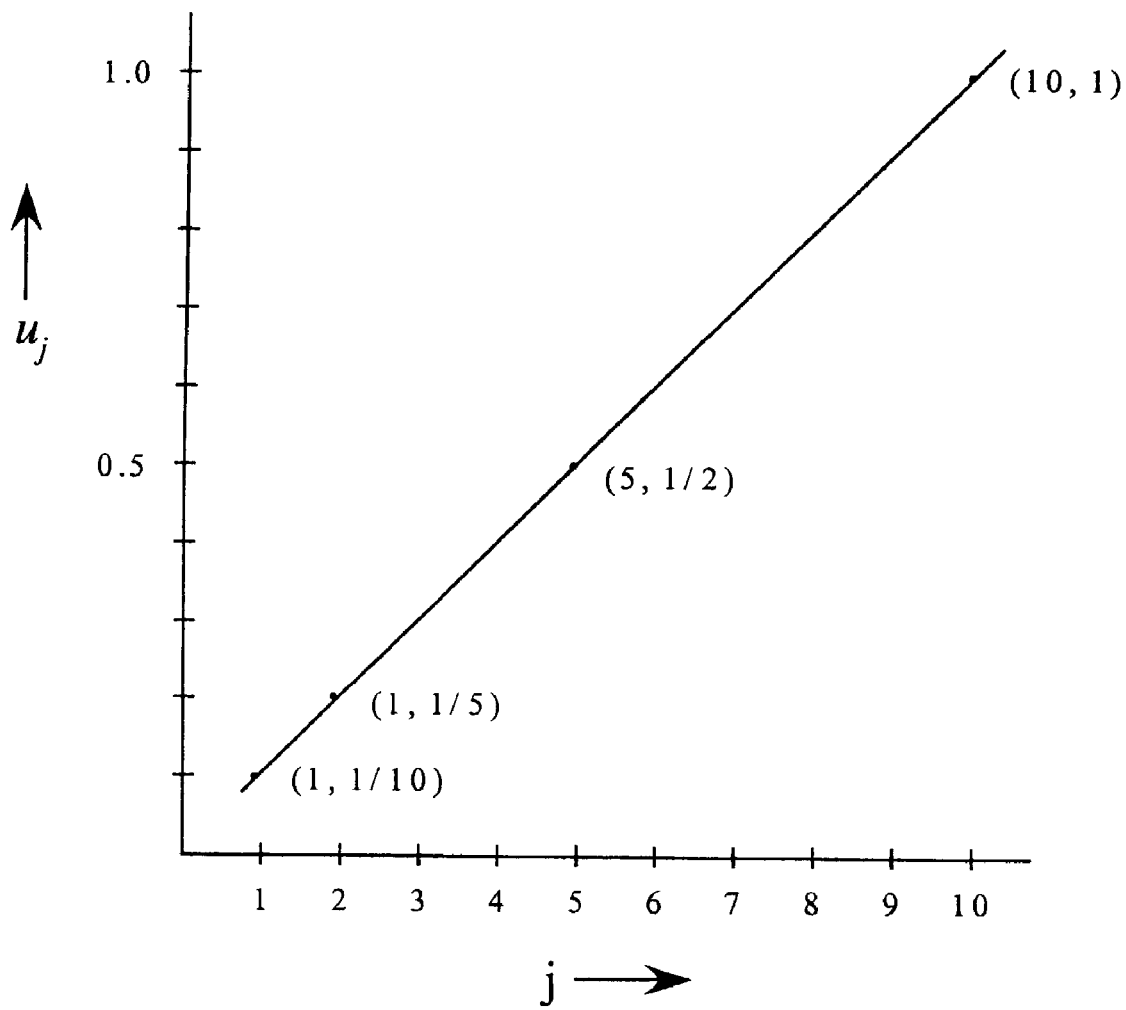
FIG. 2 is a representation of a signal that can be compressed and reconstructed according to the present invention.

FIG. 2 illustrates a one-dimensional signal that may be divided into N pixels in this manner, where N=10 for the sake of the example. Thus, in FIGS. 2–6, the x-coordinates indicating the N pixels are labeled j=1, 2, . . . , 10, and the signal may be expressed as:

$$u = \{u_j\}_{j=1}^N.$$

In general in the present description, an original signal will be denoted as u and its components as $u_j$. A reconstructed signal (i.e. data that has been regenerated from compressed data) will be denoted as v (and its components as $v_j$) or w (and its components as $w_j$), as will be seen below. In addition, a compressed signal or data will be denoted by a double bar over the compressed quantity; so $\overline{\overline{u}}$ would indicate the compressed form of the data or signal u, and similarly with any other quantities or expressions.

This simple signal is sufficient to illustrate the operation of the present invention, and it is straightforward to generalize the procedures of the invention to signals of two or more dimensions, and to real-world settings of three-dimensional phenomena.

The quantity |∇u| (rather than u) is compressed according to the present invention, and can be computed by standard finite difference methods. Thus, $$|\nabla u|_j = \frac{|u_j - u_{j-1}|}{\left(\frac{1}{N}\right)} = |u_j - u_{j-1}| \times N$$

for $j \geq 2$; and $$|\nabla u|_1 = \frac{|u_2 - u_1|}{\left(\frac{1}{N}\right)} = |u_2 - u_1| \times N.$$

For simplicity, in these examples, we may take $u_j \geq u_{j-1}$ for all j, so we can remove the absolute value notation shown above.

EXAMPLE 1

FIG. 2 shows an example of a one-dimensional linear signal u, expressible as vector of data $u = \{u_j\}$, where:

$$u_j = j/N (j=1,2, \ldots, N).$$

Figure 3:
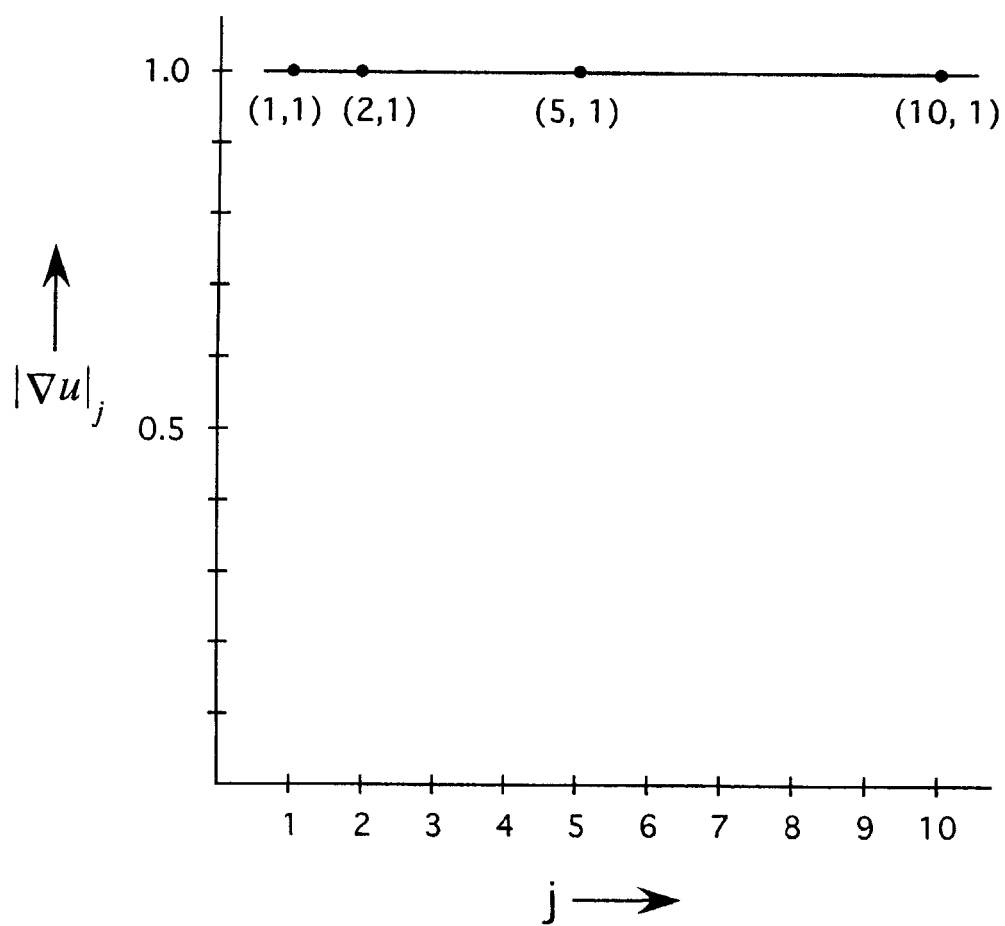
FIG. 3 is a representation of a gradient of the signal of FIG. 2.

Then $|\nabla u|_j = 1$ for all j, as shown in FIG. 3. Note that |∇u| is a constant, independent of j. Thus, the compressed value of |∇u| is the same as the uncompressed value, as in FIG. 3. In this example, then, there is no error in the compressed and uncompressed values of |∇u|, nor is there any error in u or the reconstructed v.

In general, in this description the variable u will be used to refer to the original signal or data, and the variables v and w will be used to indicate the data after reconstruction (after of the first or second gradient or derivative, as will be discussed below).

Generally, lossy compression procedures will result in errors in signals u that do not comprise constant values, so earlier methods (which compress the signals u, and not the gradient of u as in the present invention) will lead to larger errors in the gradient of the reconstructed signal, i.e. |∇u|, than in the present system. As mentioned above, the methods of the invention involving compression of gradient values instead of the original signal data are applicable in one dimension or in multiple dimensions.

EXAMPLE 2

Figure 4:
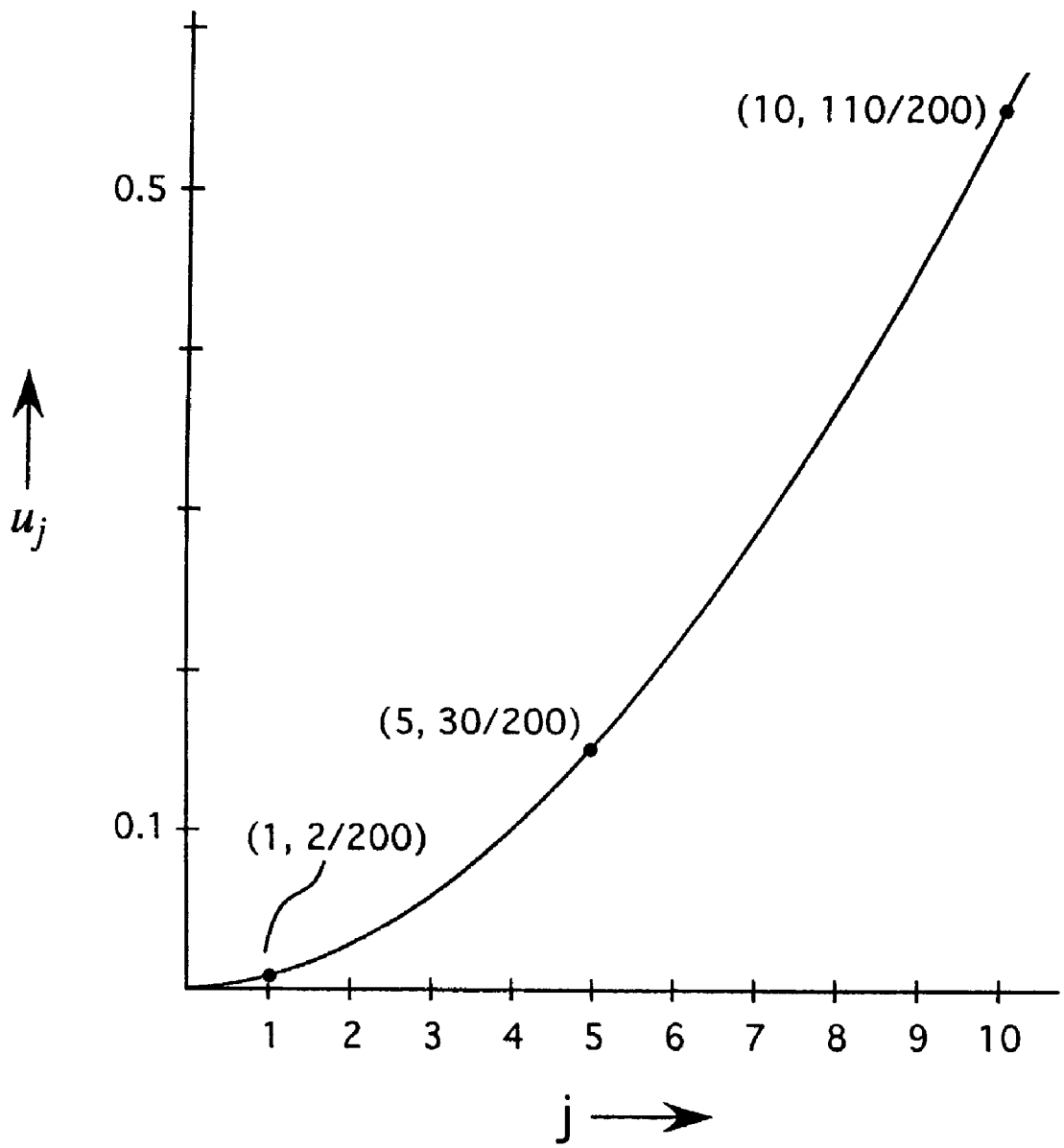
FIG. 4 is a representation of another signal that can be compressed and reconstructed according to the present invention.

FIG. 4 shows an example one-dimensional signal, expressible as:

$$u_j = \frac{j(j+1)}{2N^2}$$

(j=1,2, . . . , N)

Figure 5:
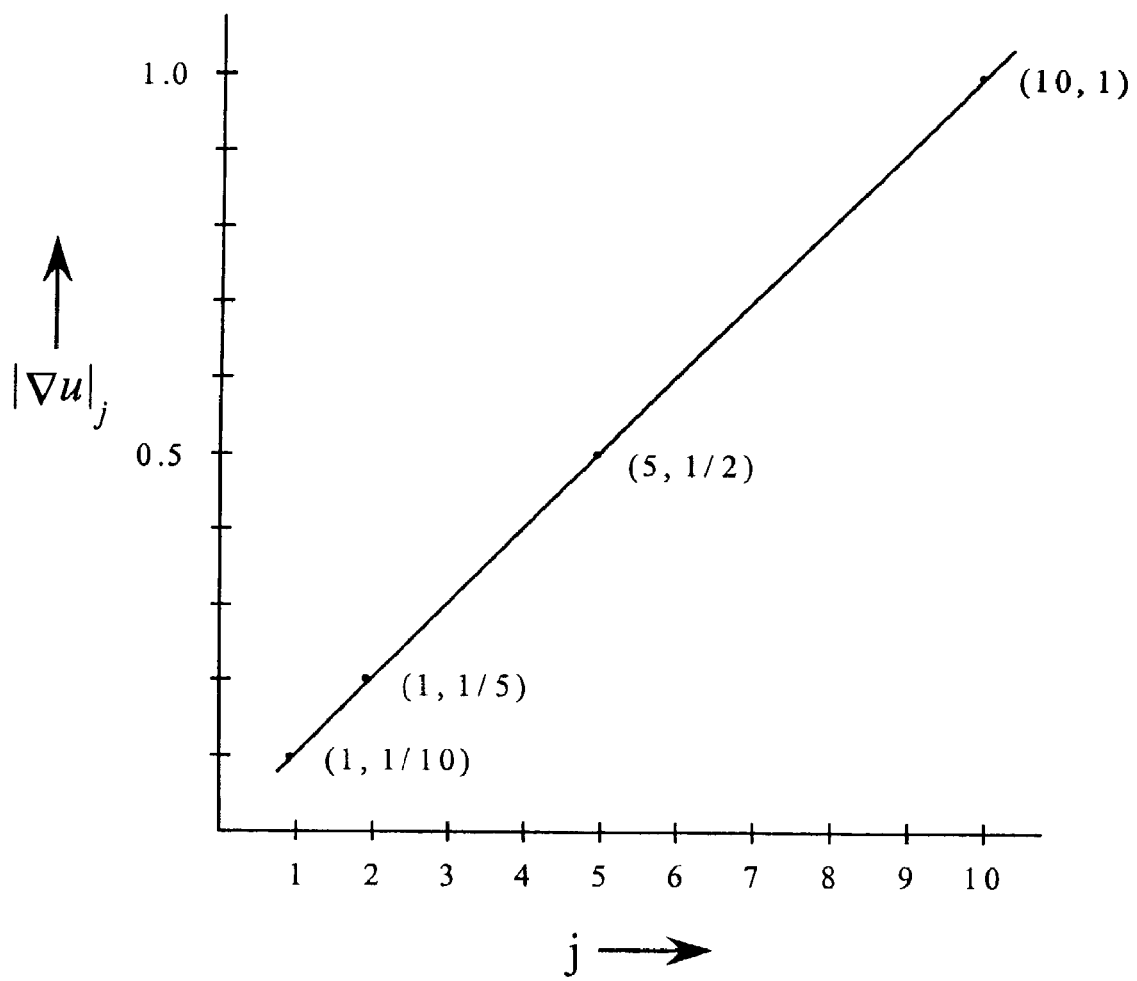
FIG. 5 is a representation of a gradient of the signal of FIG. 4.

Thus, for this signal $|\nabla u|_j = j/N$, as shown in FIG. 5. (Note that the values of $|\nabla u|_j$ in Example 2 are the same as the values of $u_j$ in Example 1, which follows since the above function for $u_j$ in Example 2 was obtained by integrating the value $u_j = j/N$ from Example 1.)

Figure 6:
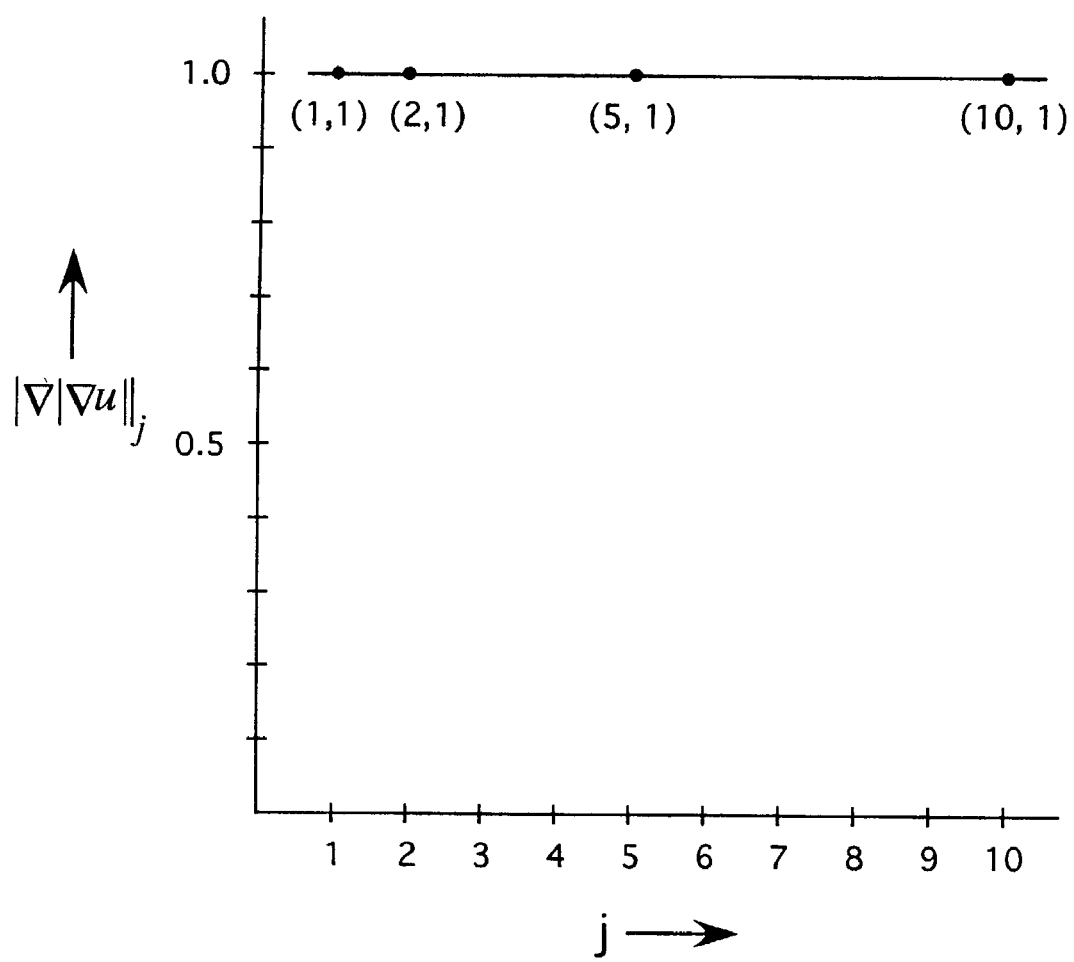
FIG. 6 is a representation of a gradient of the signal of FIG. 5.

If the approach of compressing the derivative (or gradient) of the function is used, rather than compressing the function itself, then we compute $|\nabla|\nabla u|\|$, and obtain:

$$|\nabla|\nabla u|\|_j = 1 \text{ for all j (as shown in FIG. 6).}$$

The compression of this is error-free (for this example), and hence the errors in the reconstructed w (which approximates |∇u|) and v (which approximates u) are also zero, as is the error in the curvature approximating the curvature of z=u(x). Here, $$k = \frac{u_{xx}}{(1 + u_x^2)^{\frac{3}{2}}},$$

since there is no dependence on y. Thus, the method of FIG. 7 reduces the resulting error in this example.

Using the Laplacian as described, with $\mathscr{L}(u)=u_{xx}$ (in this one-dimensional example), also results in error-free compressions of |∇|∇u||, |∇u| and u.

In apparatus implementations of the present invention, each of the steps or operations involved can be carried out by executing one or more program or logic modules. The terrain, signal or surface data can, as discussed above, be simulated or real-world (e.g. empirically gathered) data.

A processor-based system according to the invention can thus be connected to input or receiving devices (including sensors, satellite receivers, etc.) 210 and I/O channels 200 as shown in FIG. 1, and the I/O channels may communicate with other apparatus that use the processed surface and gradient signals, such as avionics (not separately shown) or other user interface equipment.

What is claimed is:

1. A method for compressing and decompressing digital terrain elevation data, images, or graphs in at least two dimensions, including the steps of:

computing a numerical approximation to at least one of the slope, curvature, and/or another predetermined geometric feature, and storing the numerical approximation together with data values prescribed at certain predetermined locations;

applying a suitable compression technique to the geometric feature; and retrieving the image;

wherein the retrieving step is carried out by numerically solving for the viscosity solution of the Eikonal Equation, using a source term derived from the compressed slope.

2. The method of claim 1, wherein the retrieving step is repeated N times, with N taken from the degree of the differential operator associated with the geometric feature.

3. The method of claim 1, wherein the viscosity solution is solved by adding the source term derived from the compressed slope to a source term derived from the error in the compressed slope.

* * * * *